United States Patent Office 3,584,002
Patented June 8, 1971

3,584,002
PROCESS FOR THE PREPARATION OF
3-OXO-BENZODIOXEPIN
Haydn W. R. Williams, Dollard des Ormeaux, Quebec,
Canada, assignor to Charles E. Frosst & Co., Montreal,
Quebec, Canada
No Drawing. Filed Aug. 26, 1968, Ser. No. 755,452
Int. Cl. C07d 17/00
U.S. Cl. 260—297                                        15 Claims

ABSTRACT OF THE DISCLOSURE

Method for synthesizing 3-oxo-benzodioxepins by reaction of a catechol or a reactive derivative thereof with an α-haloacetonitrile, and α-haloacetic acid or its ester to provide either a 1,2-di-(cyanoalkoxy)benzene or a 1,2-di-(carbalkoxyalkoxy)benzene which upon cyclization affords 3-amino-4-cyano-2H-1,5-benzodioxepin, or the keto ester respectively. These compounds then are hydrolyzed and decarboxylated with acid to afford the desired 3-oxo-benzodioxepin. The conversion of the 3-oxo-benzodioxepins to therapeutically active 3,3-disubstituted-benzodioxepins also is described.

This invention is concerned with a novel process for the preparation of 3-oxobenzodioxepins.

While the unsubstituted 3-ketobenzodioxepin product is a known compound, it was obtained in low yields as a by-product in the preparation of 1,4-benzodioxane-3-carboxylic acid. All attempts by these investigators to prepare the 3-ketobenzodioxepin either failed or provided very small yields of the desired product. As the 3-ketobenzodioxepins are essential intermediates in the preparation of 3,3 - disubstituted - benzodioxepins which exhibit valuable β-adrenergic stimulating properties making them particularly suitable for use as bronchodilating agents, it was essential to devise an efficient process for preparing these intermediates. It was discovered that these 3-ketobenzodioxepins could be obtained in good yield principally by the reaction of a catechol with a haloalkanonitrile or a haloalkanoic acid ester shown in the flow diagram.

FLOW DIAGRAM

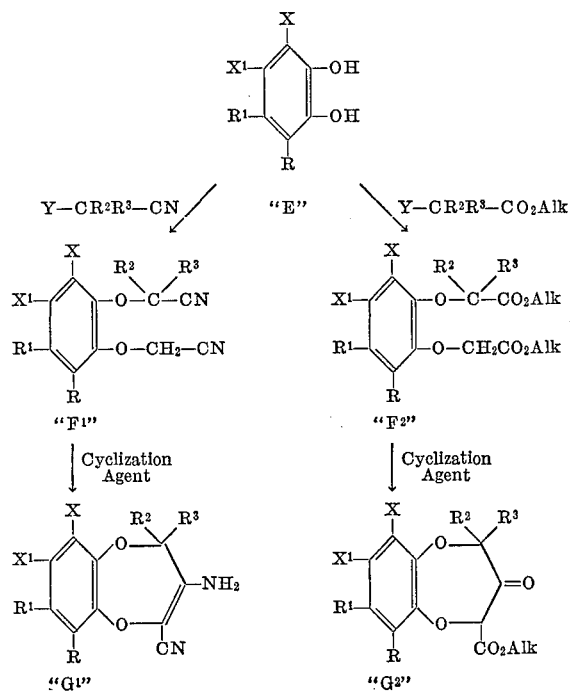

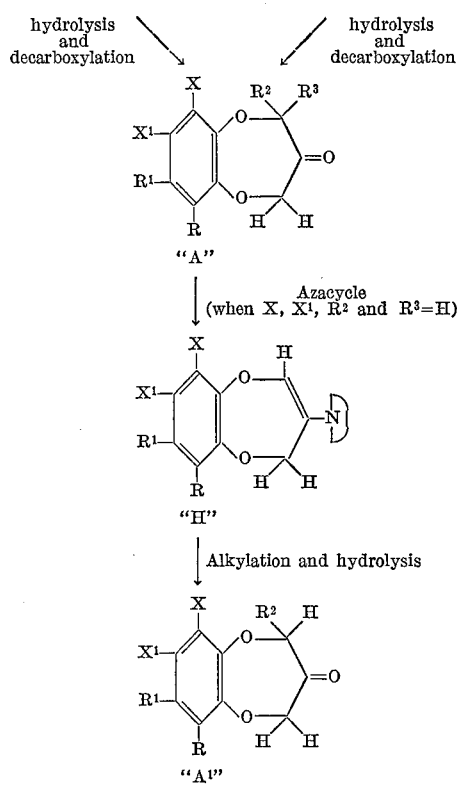

In the foregoing structures R is selected from hydrogen, hydroxy, lower alkyl ($C_{1-5}$) and lower alkoxy ($C_{1-3}$); $R^1$ is selected from hydrogen, halogen particularly chloro and bromo, lower alkyl ($C_{1-5}$), nitro, amino, acylamino wherein the acyl radical is the residue of an alkyl ($C_{1-3}$) sulfonic acid or an alkyl ($C_{1-3}$) carboxylic acid, lower carboalkoxyamino, hydroxy or lower alkoxy ($C_{1-5}$); X and $X^1$ are selected from hydrogen, lower alkyl ($C_{1-5}$) and halogen; $R^2$ and $R^3$ can be the same or dissimilar and are each separately selected from hydrogen, lower alkyl ($C_{1-5}$), phenyl or phenyl-lower alkyl ($C_{1-3}$), lower cycloalkyl, pyridyl and pyridyl-lower alkyl ($C_{1-3}$).

The novel method discovered for the preparation of 3-ketobenzodioxepins comprises the reaction of a catechol "E" or a phenolic derivative thereof with either a haloalkanonitrile or a lower alkyl haloalkanoate to give a 1,2-bis-(cyanoalkoxy)benzene, "$F^1$," or a 1,2 - bis - (alkoxycarbonylalkoxy)benzene, "$F^2$" which compounds then are cyclized, hydrolyzed and decarboxylated to provide the desired 3-ketobenzodioxepin.

According to one modification of the novel method of this invention the catechol starting material "E" is reacted with a haloacetonitrile of the structure $$Y\text{---}CR^2R^3\text{---}CN$$

to afford the 1,2 - bis - (cyanoalkoxy)benzene, "$F^1$." This reaction is carried out in one step when $R^2$ and $R^3$ each represent hydrogen. However, when it is desired to form product "$F^1$" wherein $R^2$ and $R^3$ are other than hydrogen, then the catechol ($X=X^1=R=R^1=H$) initially is treated with one equivalent of haloacetonitrile, the ortho-cyanomethoxy-phenol isolated and then reacted with the haloalkanonitrile wherein $R^2$ and/or $R^3$ are other than hydrogen. When X, $X^1$, R or $R^1$ is other than hydrogen then it is preferred to use the appropriately substituted salicylaldehyde which is treated with the appropriate haloalkanonitrile and the resulting compound oxidized by peracetic acid followed by mild hydrolysis to give the ortho-cyanoalkoxyphenol which then is heated with haloacetonitrile to provide "F¹." Product "F¹" then is cyclized by treatment with a mixture of sodamide and a solvent selected preferably from dimethyl sulfoxide (DMSO), dimethylformamide (DMF), sulfolane, benzene, toluene or xylene, or by treatment with an alkali metal butoxide or other alkali metal t.-alkanolate, in DMSO, DMF, sulfolane, benzene, toluene, xylene, or t. alkanol corresponding to the alkanolate employed, or by treatment with sodium or potassium lower alkanolate, sodium hydride, sodium-potassium amalgam (1:1) and lithio- or sodio-N methylaniline, to form the 3-amino-4-cyano-2H-1,5-benzodioxepin, "G¹." Best results are obtained when this step is carried out in an inert atmosphere such an under nitrogen or other inert gas such as argon or other usual inert gas. Intermediate "G¹" is hydrolyzed and decarboxylated to the ketone "A" either by first refluxing in aqueous acetic acid followed by refluxing with phosphoric acid, or by acid alcoholysis followed by heating in aqueous alkanol to effect hydrolysis and decarboxylation. While intermediate "G¹" is illustrated as having the structure 3-amino-4-cyano, its tautomer, 3 - imino-4-cyano-3,4-dihydro-2H-1,5-benzodioxepin may also be present. It is understood that when $X$, $X^1$, $R$ and/or $R^1$ are/is other than hydrogen additional isomers are possible. However, upon hydrolysis with concomitant decarboxylation by either of the above procedures all tautomers or isomers are converted to the 3-keto product "A."

When $X,X^1$ and all R's in product "A" are hydrogen, this product, if desired, can be reacted with an azacycle such as morpholine, piperidine, pyrrolidine, and the like to give the 3-azacyclic substituted intermediate "H" which when treated with an alklating agent as a lower alkyl iodide or bromide dialkl-sulfate or trialkyloxoniumtetrafluoroborate provides the desired 2-monosubstituted-3-keto compound "A."

The second of the modifications of the novel methods of this invention for making product "A" from the catechol "E" involves initial reaction of "E" with a haloalkanoic acid ester, halo—$CR^2R^3$—$CO_2$alkyl, to give the 1,2-bis-alkoxycarbonylalkoxybenzene, "F²." When $R^2$ and $R^3$ in compound "F²" are each hydrogen, compound "F²" is produced in one step. When $R^2$ and/or $R^3$ are other than hydrogen, then the catechol ($X=X^1=R=R^1=H$) initially is treated with haloacetic acid ester, the orthoalkoxycarbonylmethoxyphenyl isolated and then reacted with a haloalkanoic acid ester to give "F²" wherein $R^2$ and/or $R^3$ are other than hydrogen. When $X,X^1,R$ and/or $R^1$ are other than hydrogen preferably the appropriate salicylaldehyde is reacted with Y—$CR^2R^3CO_2$ alkyl wherein $R^2$ and/or $R^3$ is other than hydrogen and the resulting compounds oxidized by peracetic acid followed by mild hydrolyses to give the ortho-alkoxycarbonylalkoxyphenol or the corresponding acid which can be reesterified. The ester then is treated with an alkyl haloacetate to provide intermediate "F²." Cyclization of compound "F²" to form "G²" is effected by substantially the same method described above for the cyclization of "F¹" to provide "G¹." Hydrolysis and decarboxylation of "G²" by acid hydrolysis in a lower alkanol advantageously by employing aqueous hydrochloric acid in methanol or ethanol followed by heating gives the desired 3-keto compound "A."

The 3-ketobenzodioxepins prepared by the novel process of this invention can be converted to the therapeutically useful 3,3-disubstituted-benzodioxepins having the structural formula

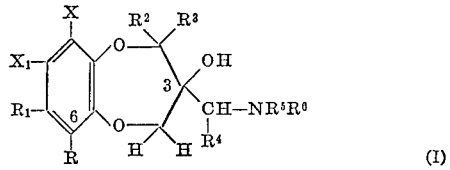

by one of two principal methods depending upon whether $R^4$ is hydrogen or whether it represents a lower akyl group. In the foregoing structure $R$, $R^1$, $X,X^1,R^2$, and $R^3$ have the meanings assigned above, $R^4$ is hydrogen or lower alkyl ($C_{1-5}$), and the grouping—$NH^5R^6$ represents the amino group or a mono or di-substituted amino group or a nitrogen containing heterocyclic group, and in particular an —$NR^5R^6$ group where $R^5$ represents hydrogen, lower alkyl ($C_{1-5}$), and substituted lower alkyl such as 2-phenyl-2-hyrdroxyethyl; and $R^6$ represents (1) lower alkyl having advantageously from 1 to 10 carbon atoms and being either straight or branched chain, and being either unsubstituted or substituted with one or more groups selected from (a) amino or mono- or di-loweralkyl ($C_{1-5}$) amino, or the amino substituent can be

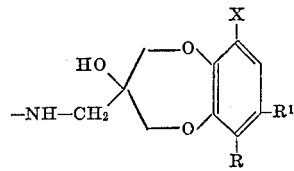

wherein R, $R^1$ and X have the above assigned meanings, (b) cycloalkyl having from 3 to 6 carbon atoms, (c) lower alkoxy having from 1 to 3 carbon atoms, (d) hydroxy substituted lower alkoxy having from 1 to 3 carbon atoms, (e) hydroxy, (f) phenyl or mono- or poly-substituted phenyl wherein the substituents are selected from halo especially chloro or bromo, hydroxy and lower alkoxy, ($C_{1-3}$) or wherein the substituted phenyl is the 3,4-methylenedioxyphenyl, (g) a heterocyclic substituent such as an indolyl, morpholino or 1,2,5-thiadiazolyloxy, (2) a cycloaliphatic such as a cycloakyl having from 3 to 10 carbon atoms such as cyclopropyl, cyclobutyl, cyclopentyl, cyclohexyl, tricyclodecane such as adamantyl and the like, or a phenyl-lower cycloalkyl as phenyl-cyclohexyl, (3) lower alkenyl having from 3 to 5 carbon atoms, (4) lower alkynyl having from 3 to 5 carbon atoms, (5) phenyl or substituted phenyl wherein the mono- or poly-substituents are selected from a halogen such as chloro and bromo, lower alkyl ($C_{1-3}$) and lower alkoxy ($C_{1-3}$), (6) a heterocyclic substituent such as 2-pyridyl, (7) the residue of a guanidine moiety

wherein $R^7$ is hydrogen, lower alkyl, benzyl or phenyl or substituted phenyl wherein the substituent is one or more groups selected from halo, particularly chloro or bromo, lower alkyl ($C_{1-3}$), or lower alkoxy ($C_{1-3}$); (8) the grouping —$NR^5R^6$ can represent a morpholino, piperazinyl or N-alkyl or N-phenylpiperazinyl.

When in the above structure $R^4$ is hydrogen, the 3-keto intermediate "A" is caused to react with aqueous hydrogen cyanide conveniently generated in situ from sodium or potassuim cyanide to provide the 3-hydroxy-3-cyano derivative of "A" which is separated and reduced to provide the 3-hydroxy-3-amionalkyl-benzodioxepin. Treatment of this compound with acetone or other ketone or aldehyde that will yield the group $R^6$ upon reduction provides the desired 3-hydroxy-3-(substituted amino)alkyl-3,4-dihydro-2H-1,5-benzodioxepin having the structure I. Additionally, the 3-hydroxy-3-aminoalkylbenzodioxepin can be treated with an alkali nitrite to form a 3-spiro-2'-oxirane derivative which when reacted with the desired amine gives the benzodioxepin I.

The first step of this procedure, that is, treatment of the 3-keto compound "A" with aqueous alkali cyanide, advantageously is carried out in the presence of acetic anhydride or other acidic solvent such as acetic acid or alternatively with anhydrous hydrogen cyanide. The reduction of intermediate 3-hydroxy-3-cyanobenzodioxepin can be either a catalytic or chemical reduction; catalytic reduction preferably being carried out with a transition metal catalyst such as platinum, palladium, nickel, ruthenium, rhodium and the like in a mixture of a lower alkanol ($C_{1-4}$) and acetic acid supplemented if necessary with a trace of mineral acid, i.e., hydrochloric acid, or if desired chemical reduction can be effected with a metal hydride advantageously lithium aluminum hydride or other metal hydrides, preferably in diethyl ether or tetrahydrofuran. Each method affords good yields of the 3-hydroxy-3-aminoalkylbenzodioxepin.

This intermediate then can be converted to the desired 3,3-disubstituted benzodioxepin, I, of this invention by either of two routes. One of the routes employed for preparing the benzodioxepin I wherein $R^5$ is hydrogen involves the reaction of the 3-hydroxy-3-aminoalkylbenzodioxepin with a ketone or aldehyde that will yield the group $R^6$ and subsequent reduction advantageously carried out by hydrogenation in the presence of a transition metal catalyst in an organic solvent such as a lower alkanol such as ethanol, propanol, butanol or isomers thereof, and the like, employing acidic conditions when required or chemical reduction with sodium borohydride can be employed.

The second and more general method for preparing the benzodioxepin I when $R^5$ and $R^6$ have the meaning given above involves the reaction of the 3-hydroxy-3-aminoalkylbenzodioxepin with an alkyl nitrite or with nitrous acid generated in situ from an alkali metal nitrite (sodium or potassium nitrite being quite suitable) advantageously carried out in an aqueous medium in the presence of an organic acid, acetic acid being preferred, and advantageously with cooling to provide the 3-spiro-2′-oxirane as well as the 3-hydroxy-3-hydroxymethyl analog, novel products that also exhibit β-adrenergic stimulating properties. The 3-spiro-2′-oxirane obtained then is reacted with the amine, $HNR^5R^6$, advantageously in the presence of an organic solvent such as a lower alkanol at ambient temperature to give the benzodioxepin I.

The 3-spiro-2′-oxirane can also be prepared by treatment of the 3-keto compound "A" with either dimethyloxosulfonium methylide or dimethylsulfonium methylide either with cooling or at a temperature up to ambient temperature. In practice, the dimethyloxosulfonium methylide is prepared under nitrogen from sodium hydride, trimethyloxosulfonium iodide and dimethyl sulfoxide. The ketone, "A," is added slowly to the mixture at room temperature and the mixture stirred for about 24 hours. The dimethylsulfonium methylide advantageously is prepared from butyl lithium and trimethylsulfonium iodide in tetrahydrofuran. The ketone "A" then is added and the reaction mixture held at 0° C. for one hour and then for a short period at ambient temperature. Isolation in each instance provides the desired 3-spiro-2′-oxirane.

Unlike hitherto known bronchial dilating agents which generally are short acting, the 3,3-disubstituted-benzodioxepins that are prepared from the 3-oxobenzodioxepins exhibit a long duration of activity. Upon testing the 3,3-disubstituted-benzodioxepins according to accepted and standard laboratory procedures in guinea pigs they were found to be orally effective within a dosage range of from about 1 mg./kg. to about 20 mg./kg. and when administered intravenously the effective dosage range was found to be between 10 microg./kg. and 2 mg./kg. At these dosages the products were found to be acceptably tolerated by the animals.

The 3,3-disubstituted-benzodioxepins can be formulated as tablets for sublingual or oral administration containing 1 to 20 mg. of the active ingredient. These tablets can be prepared by conventional methods and can contain one or more active ingredients admixed with the usual excipients as lactose, starches, talc, magnesium stearate or other known innocuous substances.

Where the term benzodioxepin is employed in the disclosure or claims it is to be understood to mean 3,4-dihydro-2H-1,5-benzodioxepin.

While the following examples will illustrate the novel method of the invention for preparing the 3-oxobenzodioxepins as well as a method for converting them to the therapeutically active 3,3-disubstituted-benzodioxepins, it is to be understood that the examples are illustrative and not limitative of the novel process which includes modifications and variations obvious to a skilled chemist and within the purview of the disclosure and claims.

EXAMPLE 1

3-oxo-3,4-dihydro-2H-1,5-benzodioxepin

Step A: Preparation of 1,2-di-(cyanomethoxy)benzene.—A mixture of 99 g. (0.9 mole) of catechol, 90.6 g. (1.2 moles) of chloroacetonitrile, 168 g. (1.22 moles) of finely powdered potassium carbonate, and 600 ml. of acetone is refluxed with stirring for one and one-half hours. The mixture then is treated with 45.3 g. (0.6 mole) of chloroacetonitrile and 84 g. (0.608 mole) of potassium carbonate, and refluxed for a further 3.5 hours. The mixture is filtered, the solids washed with 150 ml. of acetone and the combined filtrate evaporated in vacuo to give an oil. The oil which crystallizes is recrystallized from ethanol-water (8:1) to give 138 g. (81.5%) of 1,2-di-(cyanomethoxy)benzene, M.P. 85.0–86.5° C. Further recrystallization from the same solvent system affords the product melting at 85.0–85.5° C.

Analysis.—Calculated for $C_{10}H_8N_2O_2$ (percent): C, 63.82; H, 4.29; N, 14.89. Found (percent): C, 64.17; H, 4.48; N, 14.94

Step B: Preparation of 3-amino-4-cyano-2H-1,5-benzodioxepin.—Sodamide (49.2 g., 1.26 moles) is added with stirring under nitrogen to 370 ml. of dry dimethyl sulfoxide. After the initial vigorous evolution of ammonia has subsided the solution is heated one half hour at 60° C. A solution of 115.8 g. (0.616 mole) of 1,2-di-(cyanomethoxy)benzene in 246 ml. of dimethyl sulfoxide is added with stirring and cooling (water bath at ambient temperature) during one hour and the reaction mixture stirred for a further two hours at ambient temperature. A mixture of 81.5 ml. of acetic acid and 246 ml. of water is added slowly accompanied by stirring and cooling. The mixture is poured into 1.2 liters of water and the tan-colored solids collected. The solids are recrystallized from chloroform to give 75.5 g. (65%) of 3-amino-4-cyano-2H-1,5-benzodioxepin, M.P. 167–169° C. Further recrystallization from chloro affords the product melting at 168–169° C.

Analysis.—Calculated for $C_{10}H_8N_2O_2$ (percent): C, 63.82; H, 4.29; N, 14.89. Found (percent): C, 63.80; H, 4.35; N, 14.70.

Alternatively the above 3-amino-4-cyano-2H-1,5-benzodioxepin can be prepared as follows.

A solution of 9.4 g. (50 millimoles) of 1,2-di-(cyanomethoxy)benzene in 20 ml. of dimethyl sulfoxide is added under nitrogen to a stirred mixture of 12.3 g. (110 millimoles) of potassium tert.-butoxide in 30 ml. of dimethyl sulfoxide cooled in a water bath at ambient temperature. The mildly exothermic reaction raises the internal temperature of the mixture to 42° C. The mixture is stirred a further two hours and a solution of 6.6 ml. of acetic acid in 20 ml. of water added slowly with cooling. [Alternatively, the reaction mixture can be poured into the aqueous acetic acid solution.] The product is precipitated by pouring the mixture into 100 ml. of water. The beige-colored solid is collected, washed with water, and air dried to give 9.5 g. of crude product, M.P. 148–154° C. The crude product is recrystallized from 200 ml. of chloroform to afford 5.8 g. (61.7%) of 3-amino-4-cyano-2H-1,5-benzodioxepin. A mixed melting point with the product obtained above gave no depression.

Step C: Preparation of 3-oxo-3,4-dihydro-2H-1,5-benzodioxepin.—A mixture of 16.0 g. (85.1 millimoles) of 3-amino-4-cyano-2H-1,5-benzodioxepin, 18 ml. of water, and 300 ml. of acetic acid is refluxed one-half hour. The mixture is treated dropwise with 120 ml. 85% phosphoric acid and then refluxed overnight. The solution is cooled to ambient temperature and poured onto 500 g. of crushed ice. Ammonium sulfate (180 g.) is added and the solution continuously extracted with ether for several hours. The ethereal solution is evaporated to dryness to remove ether and acetic acid, and the residual oil dissolved in diethyl ether, washed with 10% sodium carbonate solution, dried, and evaporated. The resulting oil is fractionated to give 8.96 g. (64%) of 3-oxo-3,4-dihydro-2H-1,5-benzodioxepin, B.P. 52–61° C. at 0.07 mm. pressure, which, at first is a colorless oil, which solidifies.

The product of the above example can be converted to the therapeutically active 3,3-disubstituted-benzodioxepin in the following manner.

PROCEDURE A

Preparation of 3-hydroxy-3-isopropylaminomethyl-3,4-dihydro-2H-1,5-benzodioxepin hydrochloride Step A: Preparation of 3-hydroxy-3-cyano-3,4-dihydro-2H-1,5-benzodioxepin.—A solution of 13.5 g. (208 millimoles) of potassium cyanide in 27 ml. of water is added dropwise to a mixture of 18.7 g. (114 millimoles) of 3-oxo-3,4-dihydro-2H-1,5-benzodioxepin and 21.2 g. (208 millimoles) of acetic anhydride with stirring and cooling. The mixture is stirerd at ambient temperature overnight and then is made alkaline with 10% sodium carbonate solution. The product in the form of an oil is extracted with diethyl ether, treated with charcoal and dried over calcium sulfate. Evaporation of the solvent gives a solid that is recrystallized from carbon tetrachloride to give 3-hydroxy-3-cyano-3,4-dihydro-2H-1,5-benzedioxepin as plates, M.P. 108.5–110.0° C.

Analysis.—Calculated for $C_{10}H_9NO_3$ (percent): C, 62.82; H, 4.74; N, 7.33. Found (percent): C, 62.70; H, 4.52; N, 7.09.

Step B: Preparation of 3-hydroxy-3-aminomethyl-3,4-dihydro-2H-1,5-benzodioxepin hydrochloride.—A mixture of 9.5 g. (49.7 millimoles) of 3-hydroxy-3-cyano-3,4-dihydro-2H-1,5-benzodioxepin, 75 ml. of anhydrous ethanol, and 3 ml. of acetic acid is shaken under hydrogen at ambient temperature and pressure in the presence of 100 mg. of platinum oxide and a little ethanolic-hydrogen chloride. The catalyst is removed and the filtrate evaporated to dryness to give 5.2 g. of crude product, M.P. 207–214° C. Recrystallization of this crude product from isopropanol affords 3-hydroxy-3-aminomethyl-3,4-dihydro-2H-1,5-benzodioxepin hydrochloride, M.P. 228–230° C. (clearing at 238° C.).

Analysis—Calculated for $C_{10}H_{13}NO_3 \cdot HCl$ (percent): C, 51.84; H, 6.09; N, 6.06. Found (percent): C, 52.11; H, 6.13; N, 5.86.

Step C: Preparation of 3-hydroxy-3-isopropylaminomethyl-3,4-dihydro-2H-1,5-benzodioxepin hydrochloride.—A mixture of 3.92 g. (16.95 millimoles) of 3-hydroxy-3-aminomethyl-3,4-dihydro-2H-1,5-benzodioxepin hydrochloride, 1.39 g. (16.95 millimoles) of anhydrous sodium acetate, and 80 ml. of anhydrous ethanol is stirred under nitrogen for twenty minutes. Acetone (1.08 g., 18.6 millimoles) is added and the mixture stirred for thirty minutes. The mixture is hydrogenated at ambient temperature and pressure for one and one-half hours over 100 mg. of platinum oxide. The catalyst is removed, the solution evaporated to a syrup, 60 ml. of dry diethyl ether added, and a slight excess of 9.7 N ethanolic-hydrogen chloride solution added. The solids are collected to give 4.65 g. of crude product, M.P. 172–175° C. The product is recrystallized from isopropanol to give 3.05 g. (65%) of 3-hydroxy-3-isopropylaminomethyl-3,4-dihydro-2H-1,5-benzodioxepin hydrochloride, M.P. 178.5–180.0° C.

Analysis.—Calculated for $C_{13}H_{19}NO_3 \cdot HCl$ (percent): C, 57.04; H, 7.36; N. 5.11. Found (percent): C, 56.95; H, 7.29; N, 4.89.

EXAMPLE 2

3-oxo-7-chloro-3,4-dihydro-2H-1,5-benzodioxepin

Step A: Preparation of 3-amino-4-cyano-7(and/or 8)-chloro-2H-1,5-benzodioxepin.—A solution of 1,2-di(cyanomethoxy)-4-chlorobenzene (11.13 g., 50 millimoles) prepared as described in Example 1, Step A, in dimethyl sulfoxide (20 ml.) is added slowly during 0.75 hour to a stirred solution of potassium tert. butoxide (12.3 g., 110 millimoles) in dimethyl sulfoxide (30 ml.). During the addition the reaction mixture is cooled in a water-bath at ambient temperature and an atmosphere of dry nitrogen is maintained in the reaction flask. The reaction mixture is stirred a further two hours and poured slowly into a mixture of 50 g. of ice, 150 ml. of water, and 6.6 ml. of acetic acid. The pale buff solid is collected, reslurried with 100 ml. of water, and filtered. The solid is dried in a stream of air overnight to give 10.3 g. of crude product, M.P. about 199–206° C. The product is recrystallized from ethyl acetate to afford a 56–58% yield of solid, M.P. 217–219° C. Following recrystallization from 1:1 chloroform/1,2-dimethoxyethane, 3-amino-7(and/or 8)-chloro-4-cyano-2H-1,5-benzodioxepin is obtained as a colorless powder, M.P. 218.5–219.5° C.

Analysis.—Calculated for $C_{10}H_7ClN_2O_2$ (percent): C, 53.95; H, 3.17; Cl, 15.92; N, 12.58. Found (percent): C, 54.09; H, 4.38; Cl, 15.69; N, 12.72.

Step B: Preparation of 3-oxo-7-chloro-3,4-dihydro-2H-1,5-benzodioxepin.—This product is prepared by essentially the same procedure described in Example 1, Step B, except 3-amino-4-cyano-7(and/or 8)-chloro-2H-1,5-benzodioxepin is substituted for the 3-amino-4-cyano-2H-1,5-benzodioxepin of the previous example. It has M.P. 54–56° C.

The product of Example 2 also can be converted to a therapeutically active 3,3-disubstituted-benzodioxepin by substituting it for the 3-oxo-3,4-dihydro-2H-1,5-benzodioxepin employed in Step A of Procedure A and by following the procedure and employing the reagents and reaction conditions called for there is obtained 3-hydroxy-3-isopropylamino-7-chloro-3,4-dihydro-2H-1,5-benzodioxepin.

EXAMPLE 3

3-oxo-6-benzyloxy-3,4-dihydro-2H-1,5-benzodioxepin

Step A: Preparation of 2-methoxy-2-methyl-4-hydroxy-1,3-benzodioxole.—A mixture of pyrogallol (25.2 g., 0.2 mole) and trimethyl orthoacetate (26.4 g., 0.22 mole) is treated with one drop of concentrated sulfuric acid and the reaction mixture then stirred under nitrogen in an oil bath at 103–105° C. Methanol formed in the reaction in distilled up a short column and collected. After 1 hour, more trimethyl orthoacetate (2 g. 0.016 mole) and another drop of sulfuric acid are added and the temperature of the oil bath raised to 108–110° C. for a further hour. Methanol (9.6 ml.) is collected. On cooling, the dark brown oil crystallizes and is dissolved in ether (120 ml.), the ethereal solution is washed with 2% sodium carbonate solution (50 ml.) and then with saturated sodium chloride solution. Evaporation of the dried ethereal solution yields 31.2 g. of a pale yellow solid. The crude product is dissolved in boiling carbon tetrachloride (280 ml.) and some solid (mainly pyrogallol) is removed by filtration. On cooling, the solution yields 24.24 g. (66.6%) of 2-methoxy-2-methyl-4-hydroxy-1,3-benzodioxole, M.P. 106–109° C. Upon further recrystallization of the compound from carbon tetrachloride, with treatment with charcoal and activated alumina, the product melts at 114.5–115.5° C.

Analysis.—Calculated for $C_9H_{10}O_4$ (percent): C, 59.33; H, 5.53. Found (percent): C, 59.70; H, 5.85.

Step B: Preparation of 2-methoxy-2-methyl-4-benzyloxy-1,3-benzodioxole.—To a suspension of sodium hydride (2.4 g., 0.1 mole) in freshly distilled hexamethylphosphoramide (24 ml.) is added dropwise with stirring under dry nitrogen a solution of 2-methoxy-2-methyl-4-hydroxy-1,3-benzodioxole (18.2 g., 0.1 mole) in hexamethylphosphoramide (36 ml.) and stirring is continued at ambient temperature until hydrogen evolution essentially ceases. Benzyl chloride (12.65 g., 0.1 mole) is added and the mixture stirred at 75–80° C. for 5 hours. The mixture then is poured onto ice and adjusted to ca. pH 6 with acetic acid. The product is extracted with ether, and the ethereal solution washed with 2% sodium carbonate solution (50 ml.) and then with saturated sodium chloride solution. After drying over magnesium sulphate and then calcium sulfate, the ethereal solution is evaporated to give 2 - methoxy-2-methyl-4-benzyloxy-1,3-benzodioxole which can be crystallized from di-isopropyl ether.

Step C: Preparation of 3-benzyloxy-catechol.—A mixture of 2-methoxy-2-methyl-4-benzyloxy-1,3-benzodioxole (13.6 g., 0.05 mole), methanol (210 ml.) and 5 N hydrochloric acid (210 ml.) is stirred under reflux in an atmosphere of nitrogen for 10 hours. Most of the methanol is distilled off under vacuum and the product then extracted with ether. The ethereal solution is washed with water, dried over magnesium sulfate followed by calcium sulfate and evaporated to dryness to yield the crude 3-benzyloxycatechol which can be recrystallized from di-isopropyl ether.

Step D: Preparation of 3-amino-4-cyano-6-benzyloxy-3,4 - dihydro-2H-1,5-benzodioxepin.—By replacing catechol employed in Step A of Example 1 by an equivalent quantity of 3-benzyloxycatechol and following substantially the same procedures described in Steps A and B of Example 1 there are obtained sequentially 1,2-di(cyanomethoxy)-3-benzyloxybenzene and then 3-amino-4-cyano-6-benzyloxy-3,4-dihydro-2H-1,5-benzodioxepin and/or the 9-benzyloxy isomer.

Step E: Preparation of 3-oxo-6-benzyloxy-3,4-dihydro-2H - 1,5 - benzodioxepin hydrochloride.—The 3-amino-4-cyano - 6 - benzyloxy - 3,4-dihydro-2H-1,5-benzodioxepin and/or its 9-benzyloxy isomer is converted to 3-oxo-6-benzyloxy-3,4-dihydro-2H-1,5-benzodioxepin by the procedure described in Example 1, Step C.

The product of Example 3 can be converted to a 3,3-disubstituted-benzodioxepin by reacting it with potassium cyanide by the process of Step A of Procedure A to provide 3-hydroxy-3-cyano-6-benzyloxy-3,4-dihydro-2H - 1,5-benzodioxepin. This product then is reduced with lithium aluminum hydride to give 3-hydroxy-3-aminomethyl-6-benzyloxy-3,4-dihydro-2H-1,5-benzodioxepin.

EXAMPLE 4

3-oxo-3,4-dihydro-2H-1,5-benzodioxepin

Step A: Preparation of 1,2-bis-carbomethoxymethoxybenzene (or 1,2-benzene-bis methyl glycolate).—Methyl bromoacetate (57 g.) is added portionwise to a mixture of catechol (24 g.), potassium carbonate (62 g.), potassium iodide (3 g.) and acetone (500 ml.). The reaction gradually warms up and a precipitate forms. The reaction mixture then is stirred overnight at ambient temperature and the precipitated substance removed by filtration. The acetone solution is distilled to remove the acetone whereupon an oily residue is obtained which is crystallized from methanol yielding 1,2-bis-carbomethoxymethoxybenzene.

Step B: Preparation of 3-oxo-4-carbomethoxy-3,4-dihydro - 2H - 1,5 - benzodioxepin.—Potassium t. - butoxide (15.8 g.) dissolved in DMSO (130 ml.) is added dropwise over a 45 minute period to 1,2-bis-carbomethoxymethoxybenzene (18.3 g.) in DMSO (30 ml.) under an atmosphere of nitrogen. The mixture then is stirred 3 hours at ambient temperature and a mixture of acetic acid (16 ml.) and water (200 ml.) is added. The reaction mixture is extracted with benzene, the powdery material removed by filtration and the benzene then dried over magnesium sulfate and the benzene then evaporated leaving 3-oxo - 4 - carbomethoxy-3,4-dihydro-2H-1,5-benzodioxepin that is used in the following step without purification.

Step C: Preparation of 3-oxo-3,4-dihydro-2H-1,5-benzodioxepin.—3-oxo-4-carbomethoxy - 3,4 - dihydro-2H-1,5-benzodioxepin (110 g.) is added to a mixture of methanol (210 ml.), concentrated hydrochloric acid (50 ml.) and water (160 ml.) and the mixture then is refluxed for 18 hours. The product is extracted with ether, and the ether extract washed with four 50 ml. portions of sodium bicarbonate solution, then twice with 50 ml. portions of water. After drying the washed ether extract over magnesium sulfate and evaporation to remove the solvent there is obtained 3-oxo-3,4-dihydro-2H-1,5-benzodioxepin.

EXAMPLE 5

2-(2-pyridyl)-3-hydroxy-3-isopropylaminomethyl-3,4-dihydro-2H-1,5-benzodioxepin hydrochloride Step A: Preparation of 2-(2-pyridyl)-2-(2-carboxymethoxyphenoxy)acetic acid.—A mixture of 2-hydroxyphenoxy acetic acid (16.8 g. 0.1 mole) and 80 ml. of 5 N aqueous sodium hydroxide (0.4 mole) is stirred until solution is effected, then the solution treated with 2-bromo-2-(2-pyridyl)acetic acid (21.6 g. 0.1 mole), and refluxed for twenty hours. The cooled solution is taken to neutrality and the diacid crystallized from benzene to give 2-(2-pyridyl)-2-(2-carboxymethoxyphenoxy)acetic acid.

Step B: Preparation of methyl 2-(2-pyridyl)-2-(2-carbomethoxymethoxyphenoxy)-acetate.—A solution of the above diacid (30.3 g., 0.1 mole) p-toluenesulfonic acid (3 g.) and 300 mls. of methanol is refluxed for twenty-four hours and the solvent then removed and replaced by diethyl ether. The etheral solution is washed with water, 5% sodium bicarbonate, then again with water, dried over anhydrous sodium sulfate, and evaporated to give methyl 2-(2-pyridyl) - 2 - (2-carbomethoxymethoxyphenoxy)acetate.

Step C: Preparation of 2-(2-pyridyl)-3-oxo-3,4-dihydro-2H-1,5-benzodioxepin.—By following substantially the same procedure described in Example 4, Steps B and C, but substituting methyl 2-(2-pyridyl)-2-(2-carbomethoxymethoxyphenoxy)acetate for the 1,2-bis-(carbomethoxymethoxy)benzene there is obtained sequentially 2-(2-pyridyl)-3 - oxo - 4 - carbomethoxy-3,4-dihydro-2H-1,5-benzodioxepin and then 2-(2-pyridyl)-3-oxo-3,4-dihydro-2H-1,5-benzodioxepin.

The product of the above example can be converted to the therapeutically active 3,3-disubstituted-benzodioxepin in the following manner.

Preparation of 2-(2 - pyridyl)-3-hydroxy-3-isopropylaminomethyl-3,4-dihydro - 2H-1,5-benzodioxepin hydrochloride.—This product is prepared by replacing the 3-oxo-benzodioxepin employed in Procedure A, Step A, by an equivalent quantity of 2-(2-pyridyl)-3-oxo-3,4-dihydro-2H-1,5-benzodioxepin and then employing the other reactants and reaction conditions of Steps A through C of Procedure A.

EXAMPLE 6

2-phenyl-3-oxo-3,4-dihydro-2H-1,5-benzodioxepin

Step A: Preparation of 2-(2-hydroxyphenoxy)acetonitrile.—A mixture of catechol (11 g., 0.1 mole), chloroacetonitrile (5.3 g., 0.07 mole), finely powdered potassium carbonate (11.1 g., 0.08 mole) and acetone (75 ml.) is refluxed with stirring for 2 hours. The mixture then is treated with chloroacetonitrile (3.8 g., 0.05 mole) and potassium carbonate (7.6 g., 0.055 mole) and refluxed for 4 hours. The mixture is filtered, the solids washed with more acetone and the combined filtrate evaporated in vacuo to give an oil. The oil is dissolved in dilute sodium hydroxide solution, extracted with ether to remove 1,2-dicyanomethoxybenzene and the alkali solution acidified and extracted with ether. The extract is evaporated to dryness and the residue distilled in vacuo to give 2-(2-hydroxyphenoxy)acetonitrile.

Step B: Preparation of 2-phenyl-2-(2-cyanomethoxyphenoxy)acetonitrile.—A mixture of 2 - (2 - hydroxyphenoxy)acetonitrile (14.9 g., 0.1 mole), 2 - chloro-2-phenylacetonitrile (15.2 g., 0.1 mole), finely powdered potassium carbonate (13.8 g., 0.1 mole) and 80 ml. of acetone is refluxed 3 hours. The mixture then is treated with 2-chloro-2-phenylacetonitrile (7.6 g., 0.05 mole) and potassium carbonate (6.9 g., 0.05 mole) and refluxed six hours. The mixture is filtered, the solids washed with acetone and the combined filtrate evaporated in vacuo to give an oil. Crystallization of the oil affords 2-phenyl-2-(2-cyanomethoxyphenoxy)acetonitrile.

Step C: Preparation of 2-phenyl-3-oxo-3,4-dihydro-2H-1,5 - benzodioxepin.—The product is prepared by the procedure described in Example 1, Steps B and C except the 1,2-di-(cyanomethoxy)-benzene employed in Step B is replaced by an equivalent quantity of 2-phenyl-2-(2-cyanomethoxyphenoxy)acetonitrile.

The product of Example 6 can be converted to a 3,3-disubstituted-benzodioxepin by the process outlined in Procedure A by replacing the 3-oxo-benzodioxepin there employed by an equivalent quantity of 2-phenyl-3-oxo-3,4-dihydro-2H-1,5-denzodioxepin whereupon there is obtained 2 - phenyl-3-hydroxy-3-isopropylaminomethyl-3,4-dihydro-2H-1,5-benzodioxepin hydrochloride.

The procedure of Example 6 can be employed to prepare 2-pyridyl-3-oxo-3,4-dihydro-2H-1,5-benzodioxepin by replacing the 2-chloro-2-phenylacetonitrile employed in Step B by an equivalent quantity of 2-chloro-2-(2-pyridyl)acetonitrile. Many other useful 3-oxo-benzodioxepins can be prepared by employing any of the known or readily prepared 2-halo-2-substituted-acetonitriles such as, for example by employing 2 - chloro-2-(2-pyridylmethyl)acetonitrile which provides 2 - pyridylmethyl-3-oxo-3,4-dihydro-2H-1,5-benzodioxepin. Any of these 2-substituted-3-oxobenzodioxepins can, of course, be converted to the therapeutically effective 2-substituted-3,3-disubstituted benzodioxepins by the method of Procedure A or the other procedures hereinbefore described.

Some representative 2-substituted-3-oxo-benzodioxepins that are made by the procedures of Example 6 are identified in the following table. These products are prepared by replacing the 2-chloro-2-phenylacetonitrile employed in Step B of Example 6 by an equivalent quantity of the halonitrile identified in the table which when worked up by the methods and conditions described in Example 6, Steps B and C, provide the 2-substituted-3-oxobenzodioxepins identified in the following table these 2-substituted-3-oxobenzodioxepins then are converted by the methods described in Procedure A, Steps A to C to the therapeutically effective end products also identified in the table. In some instances the acetone employed in Step C of Procedure A is replaced by another ketone or aldehyde which is identified in the table to provide the $R^5$ and $R^6$ substituents.

TABLE

| Example number | X | $R^2$ | $R^3$ | Carbonyl reactant | $R^6$ |
|---|---|---|---|---|---|
| 7 | Br | C₆H₅—CH₂— | H | $(CH_3)_2CO$ | —CH(CH₃)₂ |
| 8 | Cl | CH₃ | H | HO—C₆H₄—CH₂—C(CH₃)=O | —CH(CH₃)—CH₂—C₆H₄—OH |
| 9 | Cl | CH₃CH₂— | H | (indol-3-yl)—CH₂—C(CH₃)=O | —CH(CH₃)—CH₂—(indol-3-yl) |
| 10 | Cl | CH₃(CH₂)₂— | H | C₆H₅—CH₂—C(CH₃)=O | —CH(CH₃)—CH₂—C₆H₅ |
| 11 | Cl | (CH₃)₂CH— | H | $(CH_3)_2CO$ | —CH(CH₃)₂ |
| 12 | Br | CH₃(CH₂)₃— | H | C₆H₅—CH₂—CHO | —(CH₂)₂—C₆H₅ |
| 13 | Cl | (CH₃)₂CHCH₂— | H | C₆H₅—(CH₂)₂—C(CH₃)=O | —CH(CH₃)—(CH₂)₂—C₆H₅ |
| 14 | Cl | CH₃ | CH₃ | $(CH_3)_2CO$ | —CH(CH₃)₂ |
| 15 | Cl | CH₃ | CH₃CH₂— | C₆H₅—CH₂—C(CH₃)=O | —CH(CH₃)CH₂—C₆H₅ |
| 16 | Cl | C₆H₅— | H | (indol-3-yl)—CH₂—C(CH₃)=O | —CH(CH₃)—CH₂—(indol-3-yl) |
| 17 | Br | C₆H₅—CH₂ | H | HO—C₆H₄—CH₂—C(CH₃)=O | —CH(CH₃)—CH₂—C₆H₄—OH |
| 18 | Cl | CH₃ | CH₃ | C₂H₅—C(CH₃)=O | —CH(CH₃)(C₂H₅) |

TABLE—Continued

| Example number | X | R² | R³ | Carbonyl reactant | R⁶ |
|---|---|---|---|---|---|
| 19 | Br | CH₃(CH₂)₃— | H | 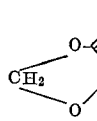 | 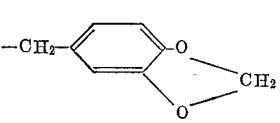 |
| 20 | Cl |  | H | CH₃—CHO | —C₂H₅ |
| 21 | Cl | CH₃ | CH₃CH₂— | 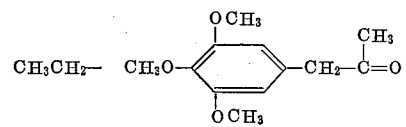 | 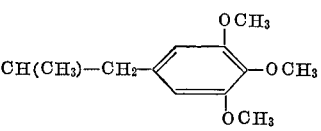 |
| 22 | Cl | CH₃CH₂ | H | 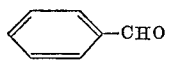 |  |

EXAMPLE 23

2-methyl-3-oxo-7-chloro-3,4-dihydro-2H-1,5-benzodioxepin

Step A: Preparation of 3-chloro-6-(1-cyanoethoxy)-benzaldehyde.—A mixture of 5-chlorosalicylaldehyde (78 g., 0.5 mole), finely powdered anhydrous potassium carbonate (103.5 g., 0.75 mole) and acetone (500 ml.) is stirred under reflux and 2-chloropropionitrile (33.6 g., 0.375 mole) is added over a period of about 5 minutes. The mixture is heated under reflux for 1.5 hours and then treated with potassium carbonate (34.5 g., 0.25 mole) followed by more 2-chloropropionitrile (11.2 g., 0.125 mole) followed by more 2-chloropropionitrile (11.2 g., 0.125 mole). Heating and stirring are continued for 3½ hours, after which the reaction mixture is filtered and the filter-cake washed with acetone. Evaporation of the combined filtrate gives 3-chlor-6-(1-cyanoethoxy)-benzaldehyde which is recrystallized from aqueous methanol.

Step B: Preparation of 3-chloro-6-(1-cyanoethoxy)-phenylformate.—To a solution of 3-chloro-6-(1-cyanoethoxy)benzaldehyde (73.3 g., 0.35 mole) in acetic acid (350 ml.) is added an approximately 1 M solution of peracetic acid (0.71 equivalents) in acetic acid. The reaction temperature is kept in the range 40–45° C. by cooling. After the addition of the peracetic acid, the mixture is stirred at ambient temperature overnight. Residual peracetic acid is estimated by titrating a small aliquot, before evaporating the reaction mixture under vacuum to a small volume. Ether is added and the etheral solution then washed with water and with 6% sodium bicarbonate solution. After a final wash with water, the etheral solution is dried and evaporated to afford 3-chloro-6-(1-cyanoethoxy)-phenyl-formate which is purified by recrystallization from benzene-petroleum ether.

Step C: Preparation of 3-chloro-6-(1-cyanoethoxy)-phenol.—3-chloro-6-(1-cyanoethoxy) - phenyl - formate (56.4 g., 0.25 mole) is added to a solution of 85% potassium hydroxide (17.1 g., 0.26 mole) in 95% alcohol (200 ml.) at ambient temperature, and the mixture then stirred overnight under nitrogen. The reaction mixture is treated with a slight excess of dilute hydrochloric acid, and most of the alcohol removed under reduced pressure. The product is extracted with ether, the ethereal extract is washed with water, then with 5% sodium carbonate solution and again with water. The ethereal extract then is dried over magnesium sulfate and then over calcium sulfate and the ether removed by evaporation yielding 3-chloro-6-(1-cyanoethoxyl)-phenol, which is crystallized from chloroform-petroleum ether.

Step D: Preparation of 3-chloro-6-(1-cyanoethoxy)-phenoxy-acetonitrile.—A mixture of 3-chloro-6(1-cyanoethoxy)-phenol (34.6 g., 0.175 mole), finely powdered anhydrous potassium carbonate (37.2 g., 0.27 mole) and acetone (250 ml.) is stirred under reflux while chloroacetonitrile (9.8 g., 0.13 mole) is added over a period of about 5 minutes. The mixture then is heated under reflux with vigorous stirring for 12.5 hours, whereupon more potassium carbonate (1.25 g., 0.09 mole) and chloroacetonitrile (3.4 g., 0.045 mole) are added. Stirring and heating are continued for 3.5 hours, then the mixture is filtered and the filter-cake washed with acetone. Evaporation of the combined filtrate affords 3-chloro-6-(1-cyanoethoxy)-phenoxyacetonitrile which is recrystallized from aqueous alcohol.

Step E: Preparation of 2-methyl-3-oxo-7-chloro-3, 4-dithydro-2H-1,5-benzodioxepin.—By replacing the 1,2-di-(cyanobethoxy)benzene employed in Example 1, Step B, by an equivalent quantity of 3-chloro-6-(1-cyanoethoxy)-phenoxyacetonitrile and then following the same procedures and employing the same reaction conditions described in Example 1, Steps B and C, there are obtained sequentially 2-methyl-3-amino-4-cyano-7-chloro-2H-1,5-benzodioxepin,
2-methyl-7-chloro-3-oxo-3,4-dihydro-2H-1,5-benzodioxepin.

Isomers that are formed during some of the above procedures are separated from the identified compounds by known methods.

EXAMPLE 24

3-oxo-3,4-dihydro-2H-1,5-benzodioxepin

Step A: Preparation of 3-amino-4-cyano-2H-1-5-benzodioxepin.—A solution of 1,2-di-(cyanomethoxy)benzene (0.5 mole) in dimethyl sulfoxide (225 ml.) is added with stirring to a mixture of sodium hydride (1.2 mole) in dimethyl sulfoxide (350 ml.) maintained under an atmosphere of argon or nitrogen. Stirring is continued for an additional two hours at ambient temperature. A mixture of acetic acid (80 ml.) and water (225 ml.) is added slowly accompanied by stirring and cooling. The reaction mixture then is quenched in about a liter of water and the precipitated material removed by filtration. After recrystallization from chloroform the 3-amino-4-cyano-2H-1,5-benzodioxepin obtained, when admixed with an authentic sample, gave no depression of melting point.

Step B: Preparation of 3-oxo-3,4-dihydro-2H-1,5-benzodioxepin.—3 - amino - 4- cyano - 2H - 1,5 - benzodioxepin (0.3 mole) is added to methanol (450 ml.) which had been saturated with hydrogen chloride at ambient temperature. The reaction mixture is stirred at ambient temperature until all solid material is dissolved and thereafter allowed to stand for six days at ambient temperature. Additional methanol (450 ml.) and water (900 ml.) are added and the mixture then heated at reflux for ten hours. Evaporation of the reaction mixture gave an 80% yield of 3-oxo-3,4-dihydro-2H-1,5-benzodioxepin that, upon mixed melting point determination with an authentic sample, gave no depression.

EXAMPLE 25

3-oxo-3,4-dihydro-2H-1,5-benzodioxepin

Step A: Preparation of 3-amino-4-cyano-2H-1,5-benzodioxepin.—A finely divided suspension of sodium (12.7 g., 0.55 g. atom) and potassium (1.3 g.) in dry toluene (100 ml.) is stirred, under nitrogen, at 80° C. and a solution of fluorene (9.9 g.), 1,2-di-(cyanomethoxy)benzene (0.55 mole) and dry toluene (300 ml.) added in one portion. The mixture is kept 4 hours at 80–85° C. whereupon 95% alcohol (150 ml.) is added to destroy excess metal. Water (700 ml.) is added and the precipitated 3-amino-4-cyano - 2H - 1,5-benzodioxepin obtained, after recrystallization from chloroform gave no depression in melting point when admixed with an authentic sample.

Step B: Preparation of 3-oxo-3,4-dihydro-2H-1,5-benzodioxepin.—This product is prepared from the 3-amino-4-cyano-2H-1,5-benzodioxepin of Step A by the procedure described in Example 1, Step C.

EXAMPLE 26

3-oxo-3,4-dihydro-2H-1,5-benzodioxepin

A mixture of naphthalene (18.3 g.), diethyl ether (450 ml.) and metallic sodium (5.5 g.) is heated and treated under an atmosphere of nitrogen with N-methylaniline and the mixture then refluxed for 1.5 hours. A solution of 1,3-di-(cyanomethoxy)benzene (9.4 g., 50 millimoles) in diethyl ether is added through a Herschberg dropping funnel during 1.25 hours, and refluxed an additional hour. Upon cooling, water is added slowly, the ethereal layer separated and concentrated and the residue steam distilled to remove the N-methylaniline and hydronaphthalenes. The residue is recrystallized from chloroform to give 3-amino-4-cyano-2H-1,5-benzodioxepin. This product when treated by the procedure described in Step C of Example 1 provides 3-oxo-3,4-dihydro-2H-1,5-benzodioxepin which upon a mixed melting point determination with an authentic sample gave no depression.

EXAMPLE 27

6-methoxy-3-oxo-3,4-dihydro-2H-1,5-benzodioxepin

To 3-amino-4-cyano-6-(or 9)-methoxy-2H-1,5-benzodioxepin (61.3 g., 0.28 mole) is added 450 ml. of methanol which has been saturated with hydrogen chloride at ambient temperature. The mixture is stirred at room temperature until all solid is dissolved, and the solution then is allowed to stand at ambient temperature for 6 days. Work-up of the reaction mixture yields the β-keto ester. However, on this occasion methanol (450 ml.) and water (900 ml.) are added and the mixture heated under reflux for 10 hours. Evaporation of the reaction mixture to a small volume yields 45.1 g. (82.7%) of product, M.P. 101–104° C.

While the invention has been described and illustrated by certain specific methods for preparing 3-oxobenzodioxepins, it is to be understood modifications thereof within the knowledge of those skilled in the art and within the purview of the disclosure and claims can be made without departing from the inventive concept.

What is claimed is:
1. A process for the preparation of a 3-oxobenzodioxepin having the structure

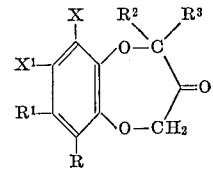

wherein a 3-R-4-$R^1$-5-$X^1$-6-X-catechol or a phenolic derivative thereof selected from the cyanoloweralkoxy and the carboxymethoxy derivative (1) is caused to react with an agent selected from halo—$CH^2R^3$—CN and halo—$CH^2R^3$—$CO_2Y$ at a temperature between about ambient to about reflux, Y being hydrogen or lower alkyl and when Y is hydrogen esterifying the obtained acid, (2) cyclizing the obtained compound by treatment with sodamide or an alkali metal tertiary alkanoate in the presence of a solvent selected from DMSO, DMF, sulfolane, benzene, toluene, xylene or a tertiary alkanol corresponding to the tertiary alkanoate employed, or by treatment with sodium or potassium lower alkanoate, sodium hydride, sodium-potassium amalgam or lithio- or sodio-N-methylaniline followed by (3) acid hydrolysis with concomitant decarboxylation by heating up to reflux to give the 3-oxobenzodioxepin wherein in each of the preceding structures R is selected from hydrogen, hydroxy, lower alkyl, and lower alkoxy; $R^1$ is selected from hydrogen, halogen, lower alkyl, nitro, amino, acylamino, lower carboalkoxyamino, hydroxy and lower alkoxy; X and $X^1$ are selected from hydrogen, lower alkyl and halogen; $R^2$ is selected from hydrogen, lower alkyl, phenyl, phenyl-lower alkyl, pyridyl and pyridyl-lower alkyl, and $R^3$ is selected from hydrogen, lower alkyl, phenyl and phenyl-lower alkyl.

2. A process as claimed in claim 1 wherein the catechol starting material is caused to react with a haloacetonitrile having the structure halo—$CH_2CN$, thus providing as end product 3-oxo-6-R-7-$R^1$-8-$X^1$-9-X-3,4-dihydro-2H-1,5-benzodioxepin wherein R, $R^1$, $X^1$ and X have the meanings assigned in claim 1.

3. A process for the preparation of a 3-oxobenzodioxepin wherein a 3-R-4-$R^1$-5-$X^1$-6-X-catechol is caused to react with haloacetonitrile to form a 1,2-dicyanomethoxy-3-R-4-$R^1$-5-$X^1$-6-X-catechol which is cyclized by treatment with an agent selected from sodamide, an alkali metal alkanolate, sodium hydride, a sodium-potassium amalgam, lithio-N-methylaniline and sodio-N-methylaniline to form a 3-amino-4-cyano-6-R-7-$R^1$-8-$X^1$-9-X-2H-1,5-benzodioxepin which is hydrolyzed and decarboxylated by treatment with acid to provide 3-oxo-6-R-7-$R^1$-8-$X^1$-9-X-3,4-dihydro-2H-1,5-benzodioxepin, wherein in each of the foregoing compounds, R, $R^1$, $X^1$ and X have the meaning assigned in claim 1.

4. A process as claimed in claim 2 wherein starting material is catechol, thus providing 3-oxo-3,4-dihydro-2H-1,5-benzodioxepin.

5. A process as claimed in claim 3 wherein the starting material is catechol, thus providing 3-oxo-3,4-dihydro-2H-1,5-benzodioxepin.

6. A modification of the process claimed in claim 1 wherein catechol is caused to react with one equivalent of haloacetonitrile, the ortho-cyanomethoxyphenol obtained then reacted with halo—$CH^2R^3$—CN to give the 1 - (O-$CR^2R^3CN$)-2-cyanomethoxybenzene which when cyclized, hydrolyzed and decarboxylated provides 2-$R^2$-2-$R^3$-3-oxo-3,4-dihydro-2H-1,5-benzodioxepin wherein in each of the foregoing compounds $R^2$ and $R^3$ have the meanings assigned in claim 1 except one does not represent hydrogen.

7. A process as claimed in claim 6 wherein cyclization is effected by treatment with an agent selected from sodamide, an alkali metal alkanolate, sodium hydride, a sodium-potassium amalgam, lithio-N-methylaniline, and sodio-N-methylaniline, and hydrolysis with concomitant decarboxylation is effected by treatment with acid.

8. A process as claimed in claim 7 wherein ortho-cyanomethoxyphenol is caused to react with 2-halo-2-(2-pyridyl)acetonitrile to provide as end product 2-(2-pyridyl)-3-oxo-3,4-dihydro-2H-1,5-benzodioxepin.

9. A process as claimed in claim 7 wherein ortho-cyanomethoxyphenol is caused to react with 2-halo-2-(2-pyridylmethyl)acetonitrile to provide as end product 2-(2 - pyridylmethyl)-3-oxo-3,4-dihydro-2H-1,5-benzodioxepin.

10. A process as claimed in claim 7 wherein ortho-cyanomethoxyphenol is caused to react with 2-halo-2-phenylacetonitrile thus providing as end product 2-phenyl-3-oxo-3H-dihydro-2H-1,5-benzodioxepin.

11. A modification of the process claimed in claim 1 wherein catechol is caused to react with one equivalent of haloacetic acid or its ester, the obtained ortho-carboxyphenol or its ester then reacted with halo-$CR^2R^3$-$CO_2H$ or its ester to provide a

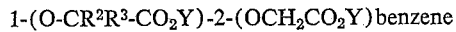

wherein Y and $Y^1$ are selected from hydrogen and lower alkyl and when hydrogen, the obtained compound is esterified, and the diester then cyclized, hydrolyzed and decarboxylated to provide a 2-$R^2$-2-$R^3$-3-oxo-3,4-dihydro-2H-1,5-benzodioxepin wherein $R^2$ and $R^3$ have the meanings assigned in claim 1 except one R is not hydrogen.

12. A process as claimed in claim 11 wherein cyclization is effected by treatment with an agent selected from sodamide, an alkali metal alkanolate, sodium hydride, a sodium-potassium amalgam, lithio-N-methylaniline and sodio-N-methylaniline, and hydrolysis with concomitant decarboxylation is effected by treatment with acid.

13. A process as claimed in claim 12 wherein ortho-carboxymethoxyphenol or its ester is caused to react with 2-halo-2-(2-pyridyl)acetic acid or its ester thus providing as end product 2-(2-pridyl)-3-oxo-3,4-dihydro-2H-1,5-benzodioxepin.

14. A process as claimed in claim 12 wherein ortho-carboxymethoxyphenol or its ester is caused to react with 2-halo-2-(2-pyridylmethyl)acetic acid or its ester to provide as end product 2-(2-pridylmethyl)-3-oxo-3,4-dihydro-2H-1,5-benzodioxepin.

15. A modification of the process as claimed in claim 1 wherein 3-oxo-3,4-dihydro - 2H - 1,5-benzodioxepin is caused to react with an azacycle selected from morpholine, piperidine and pyrrolidine and the 3-azacyclic substituted compound formed alkylated with an agent selected from alkyl halide, dialkylsulfate and trialkyloxoniumtetrafluoroborate to give 2-alkyl-3-oxo-3,4-dihydro-2H-1,5-benzodioxepin.

References Cited

Murai, Science Repts. Saitama Univ. 1A, 147–51 (1954), [original unavailable, ∴ C.A. 50:981f supplied].

Zil'berman et al.: Zhur. Obshchei Khim. 31, 1321–4 (1961). [original unavailable, ∴ C.A. 55:27040g supplied].

HENRY R. JILES, Primary Examiner

G. T. TODD, Assistant Examiner

U.S. Cl. X.R.

260—247.1, 247.2, 247.5, 247.7, 293.4, 294, 294.3, 294.7, 295, 296, 326.3, 326.5, 340.3, 465

PO-1050
(5/69)

UNITED STATES PATENT OFFICE
CERTIFICATE OF CORRECTION

Patent No. 3,584,002          Dated June 8, 1971

Inventor(s) Haydn W. R. Williams

It is certified that error appears in the above-identified patent and that said Letters Patent are hereby corrected as shown below:

In column 3, line 44, change "phenyl" to read ---phenol---.
In column 4, line 1, correct "-$NH^5R^6$" to read --- -$NR^5R^6$ ---.
In column 6, line 38, correct "chloro" to read ---chloroform---.
In column 13, lines 39 and 40, delete the second occurrence of "followed by more 2-chloropropionitrile (11.2 g., 0.125 mole)"; and in line 43, correct "chlor" to read ---chloro---.
In column 16, in line 16 of Claim 1, change "$CH^2R^3$" in both occurrences to read ---$CR^2R^3$---; and in line 67, change "$CH^2R^3$" to read ---$CR^2R^3$---. In column 17, line 20, immediately following the word "carboxy" insert ---methoxy---.

Signed and sealed this 4th day of January 1972.

(SEAL)
Attest:

EDWARD M. FLETCHER, JR.          ROBERT GOTTSCHALK
Attesting Officer          Acting Commissioner of Patents